April 28, 1970   F. D. WERNER ET AL   3,509,320
ROLL HEATER AND TEMPERATURE SENSOR ASSEMBLY
Filed July 19, 1967   2 Sheets-Sheet 2
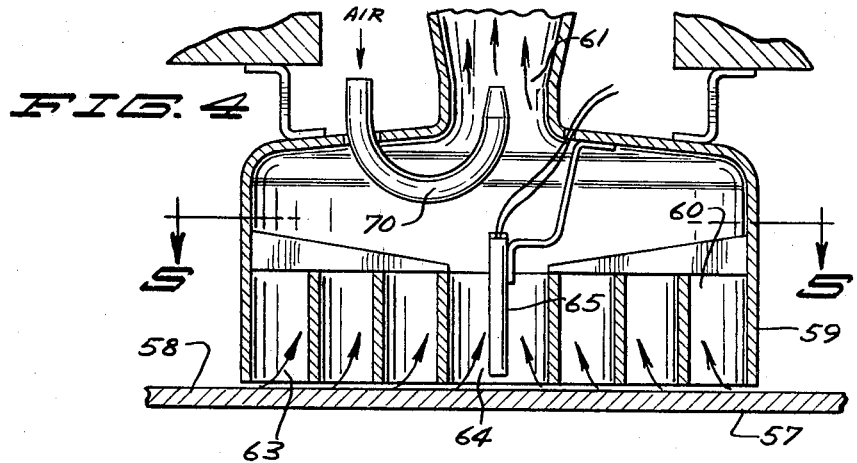
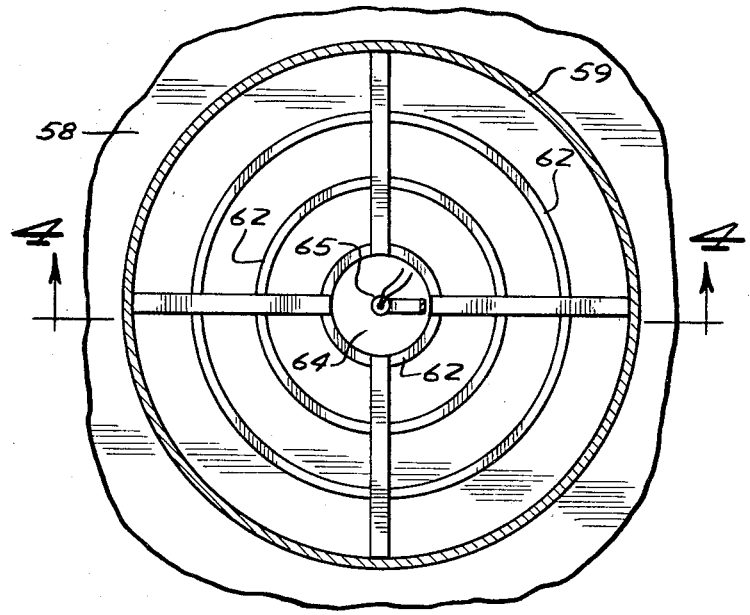
INVENTORS
FRANK D. WERNER
AUGUST R. HANSON
BY ROBERT A. JOHNSON
ATTORNEYS United States Patent Office 3,509,320
Patented Apr. 28, 1970

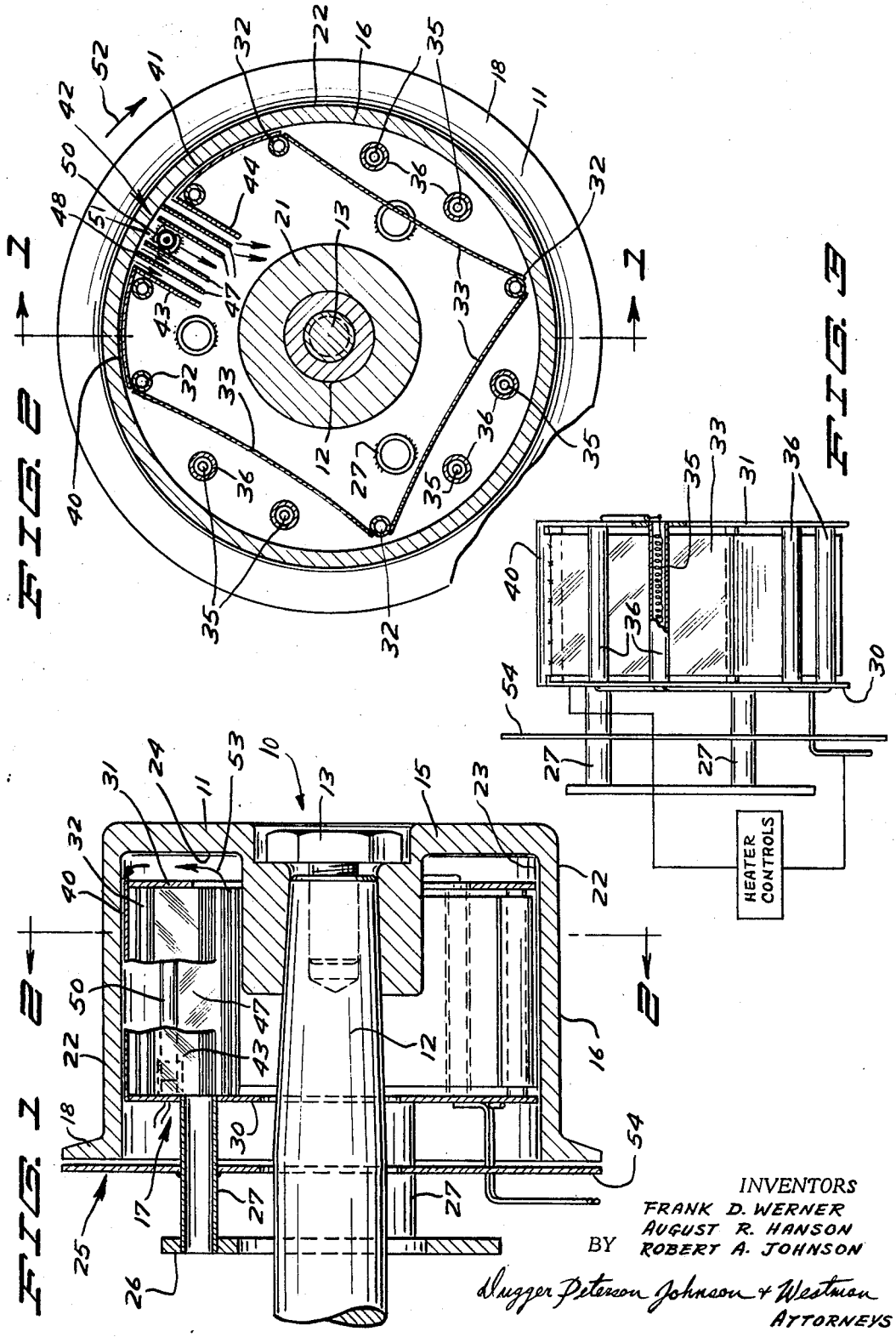

3,509,320
ROLL HEATER AND TEMPERATURE SENSOR ASSEMBLY
Frank D. Werner, Bloomington, August R. Hanson, Rosemount, and Robert A. Johnson, Bloomington, Minn., assignors to Rosemount Engineering Company, Minneapolis, Minn., a corporation of Minnesota
Filed July 19, 1967, Ser. No. 654,500
Int. Cl. H05b 1/02; B21b 27/06
U.S. Cl. 219—471                    21 Claims

ABSTRACT OF THE DISCLOSURE

A temperature sensing assembly for sensing the temperature of a surface including a plurality of spaced apart baffle walls positioned very close to a surface to be sensed and forming fluid passageways through which air from adjacent the surface is passed, and a temperature sensor mounted between two of the baffle walls to enable sensing temperatures of air that comes from very close to the surface.

The temperature sensing assembly is used in connection with a rotating roll that has a heater mounted on the interior thereof and which includes resistance heating elements mounted within quartz tubes to minimize convection and allow a greater measure of radiant heat transfer from the elements. The elements are backed by radiation shields to direct radiant heat energy outwardly toward the shell of the rotating roll.

BACKGROUND OF THE INVENTION

Field of the invention

This invention relates to a way of sensing the true temperature of a surface without contacting it and to a heater construction for rotating rolls which cooperates to permit maintaining accurate control of the roll temperature.

Description of the prior art

In heated roll assemblies, which are normally used for draw rolls or drying rolls in paper making and yarn and film treatment, it has been common to use electrical heating elements mounted on the interior of the roll while the roll rotates around the heating elements. High speed rotation causes a good bit of air flow past the heating elements which leads to convection of heat out through the openings around the roll. In addition, the control of the heating elements has been extremely difficult because the sensing of the true temperature of the roll surface is critical to maintaining a proper surface temperature and this temperature sensing has been very inaccurate. In sensing the temperature of any moving surface, in particular, one difficulty is in mounting the temperature sensor close enough to the surface so that the temperature right at the surface can be sensed. Ideally, the boundary layer of air on the surface would be surrounding the temperature sensor. Of course, from a mechanical assembly standpoint, the temperature sensor has to be mounted with some clearance. As soon as the sensor moves away from the surface, the temperature drops off substantially. Not only that, where a great bit of convection heating occurs, the movement of air past the heater and sensor affects the sensor temperature and this in turn gives erroneous readings. In order to overcome this, the mounting of a sensor in an annular groove in a rotating roll, such as that shown in Patent No. 3,280,305, has been done. However, this again requires extensive, expensive machining to get a true annular groove in which the sensor can ride and if the groove is large, much of the advantage is lost because air will tend to flow in and out of the groove as the roll rotates.

SUMMARY OF THE INVENTION

This invention relates to a sensor assembly usable for sensing the temperature of any surface and which includes a plurality of spaced apart baffle walls. The baffle walls are positioned so that one edge of each wall is closely adjacent to the surface which is to be sensed for temperature and the main part of the wall extends away from the surface. Air from the surface is diverted or drawn away from the surface and through fluid passages formed by the spaced baffles. The first baffle wall as viewed in direction of air flow removes the outer layer of the air from the surface and diverts it away from the surface. Each succeeding baffle wall diverts air which has been closer to the roll surface than the previously diverted air. This means that by using two or three or more baffle walls, air flowing past the second or third baffle wall will be from adjacent to the boundary layer of air on the surface and thus substantially identical in temperature with the true surface temperature. By mounting a temperature sensor in a fluid passageway formed between two of these baffle plates, to sense the temperature of air from close to the surface, an accurate measure of the surface temperature can be made. The baffles can be viewed in one sense as scraping succeeding layers of air from the surface being sensed until the layer in intimate contact with the surface is passed over the sensor.

Specifically, in using the sensor assembly for controlling the temperature of heated rotating rolls, the heaters themselves are mounted inside quartz tubes so that the heat is transferred to the roll by radiation to a greater degree than in the prior art structures. This means that air flow past the heaters which are within the interior of the roll does not affect the transfer of heat. Because the air flow does not affect the transfer of heat and radiation is largely the method of heat transfer, there is very little heat lost because of a discharge of air that has been heated by convection.

Because the heaters as shown are surrounded by the quartz tubes which are relatively transparent to radiation, the heaters can be opreated even when the roll has stopped because the cooling effect of the air will not affect the heaters and the normal problem of burning out heaters after the roll stops spinning will be eliminated. The heaters will function whether or not the roll is spinning. Another advantage of using the tubular shields over the heaters is that because heat is transferred to the roll by radiation, the distance of the heaters from the roll is not as important as previously, and the heaters can be spaced from the roll to allow for normal manufacturing tolerances, reducing the precision with which the device must be manufactured and correspondingly reducing the cost of manufacture.

The invention thus relates to a heater assembly includ- including means for mounting the heater to obtain maximum utilization of the heaters, and a way of mounting temperature sensors for surfaces such as those on rotating rolls and providing baffles for scavenging away the air from the surface and passing a current of air taken from intimate contact with the roll surface over the sensor and then using this sensed temperature to provide suitable controls for the heaters.

BRIEF DESCRIPTION OF THE DRAWINGS

FIGURE 1 is a vertical sectional view of a typical heated roll utilizing an interior heater and temperature sensor assembly made according to the present invention and taken as on line 1—1 in FIGURE 2;

FIGURE 2 is a sectional view taken as on the line 2—2 of FIGURE 1;

FIGURE 3 is a side view of the heater assembly of the present invention with the roller removed for the sake of clarity and with parts in sections and part broken away;

FIGURE 4 is a vertical sectional view of a second form of the temperature sensor assembly made according to the present invention and taken as on line 4—4 in FIGURE 5; and FIGURE 5 is a sectional view taken as on line 5—5 in FIGURE 4.

DESCRIPTION OF THE PREFERRED EMBODIMENTS

A roll and heater assembly illustrated generally at 10 includes a rotating outer roll 11 drivably mounted onto a shaft 12 and secured thereto with a suitable cap screw 13. The shaft 12 is powered from a suitable source of power (not shown) and is rotating at relatively high speed.

As shown, the roll has an end plate 15 and an annular cylindrical flange 16 extending therefrom and defining an interior chamber 17. An annular radially extending rib 18 is positioned at the end of the flange 16 adjacent the open end of the chamber. A hub 21 is integral with the end plate 15 and fits over the shaft 12. The hub extends into the chamber 17. The flange 16 has an outer surface 22 and an inner surface 23. The inner surface 23 defines the annular limits of chamber 17. The end plate 15 also has inner surface 24 which defines the end of chamber 17.

Thus, the unit is a cup-shaped roll. The outer surface 22 of the roll 11 has to be heated. A roll requiring such heat may be used in the manufacture of synthetic fibers or the like. The temperature of the surface 22 has to be maintained at a preselected temperature range.

In order to heat the roll, a roll heater and temperature sensor assembly 25 is mounted within the chamber 17. The assembly 25 does not rotate but is stationarily mounted with a mounting plate 26 which is mounted to the machine providing power for the shaft 12. The means of mounting is not shown, and the mounting plate can be attached to the machine in any conventional manner with conventional holding means. The roll rotates around the heater assembly 25. The mounting plate in turn, as shown, fixedly mounts three heater support tubes 27 arranged around the plate 26. The support tubes carry the heater assembly and support the entire structure.

The inner ends of the support tubes are fixedly attached to a first radiation shield end plate 30 which is of size to fit within the chamber 17 and has an outer peripheral edge that is very closely spaced from the inner surface 23 of the roll 11. The support plate 26 and the end plate 30 both have center openings through which the shaft 12 extends. A second end plate 31 is positioned parallel to and spaced from plate 30. The plates 30 and 31 are joined together with tie rods 32 that are suitably fixedly attached to the end plates to hold them securely in an assembly. This makes a rigid assembly from the mounting plate, to the tubes 27, to the plate 30, to the tie rods 32 and to the plate 31.

As shown, three heat reflective plates 33 (radiation shield means) extend between the end plates 30 and 31 and lie in direction parallel to the axis of the shaft 12. The plates 33 are fastened to the tie rods at their junctions. As shown, they are slightly concave when viewed from the outside. The three plates 33 provide radiant heat reflective shields for heater elements 35 which are mounted between the end plates 30 and 31 in a suitable manner. The elements 35 are arranged so that there are two by each of the radiant energy shield plates 33. The elements comprise coils of resistance wire and each of the lengths of coil extending between the end plates 30 and 31 is surrounded by a quartz tube 36 forming a convection shield around the element and extending between the end plates 30 and 31. Each of the quartz tubes surrounds one of the heater elements and prevents air from directly striking the heater elements unless it passes axially through the tubes.

The two heater elements 35 adjacent each of the plates 33 are connected in series, and the three sets (one set by each of the plates 33) are connected in parallel for the heating circuit. The axially extending heater elements distribute the heat axially along the flange 16 from the inner end to the outer end. The axial extension of the heater coil elements aids in even heat distribution for the roll. The plates 33 provide good radiation shields and prevent the elements 35 from radiating their heat energy in towards the center of the heater assembly.

The three plates 33 form a U-shape when shown in cross section such as FIGURE 2, and at the open end of the U, a pair of part-cylindrical panels forming baffles 40 and 41 are mounted at the periphery of the end plates 30 and 31 and extend between them. One edge of the panel or baffle 40 is joined to one of the radiation shield plates 33 and one edge of the panel or baffle 41 is joined to the oppositely disposed plate 33. The baffle panels 40 and 41 are spaced apart to form an opening 42 therebetween. The opening is defined by a pair of baffle walls 43 and 44, attached to the baffle panels 40 and 41, respectively, and which are positioned parallel to a plane bisecting the opening 42 and passing through the axis of the roll assembly. In other words, they extend away from the portion of the inner surface 23 to which they are adjacent. As shown, there are a plurality of spaced, parallel baffle walls 47 that are also parallel to the baffle walls 43 and 44 and are positioned so they are within the opening 42 and all these baffles extend in axial direction between the end plates 30 and 31. The baffle walls 47 extend outwardly just so their outer edge is slightly beyond the periphery of the baffles 40 and 41. This means that the edges 48 of the baffle walls 47 are more closely adjacent the inner surface 23 of the flange 16 than the baffle panels 40 and 41.

Thus, it can be seen or considered that the plates 33 together with the baffle panels 40 and 41, form a core housing for the heater assembly which has a peripheral wall that is closed except for the opening 42. Also, there is an opening in the plate 30 for shaft 12 and an opening for hub 21 in the plate 31. As the roll rotates there is a centrifugal pumping action of air causing a flow of air through opening 42 toward the roll axis and then radially outwardly along the surface 24. This will be more fully explained later.

The two center baffle walls 47 which are closer to the center of the opening 42 are spaced apart to form a fluid passageway which is of size to permit an axially extending temperature sensor 50 to be mounted therein. The sensor is spaced inwardly from the outer edges 48 of the baffle walls 47. Air moving through the fluid passageway 51 has to pass over the temperature sensor. The baffle walls and baffle panels also act as radiant energy shields around the temperature sensor. The sensor is mounted to end wall 30.

The spacings of the baffle panels 40 and 41 from the inner surface of the roll are relatively small. Normally, this is on the order of 0.030 inch or so, and then the edges 48 of the baffles extend to within 0.020 inch or so of the inner surface of flange 16.

When the roll 11 is rotated, for example, in direction indicated by arrow 52, there will be air adjacent inner surface 23 of flange 16. A layer of this air will move with the roll as it rotates. Of course, part of the air will be sheared off or drop off, but a boundary layer of air will be carried at the same temperature as the flange itself. If the heater is working, the radiation will heat the inner surface of the roll and this in turn will heat the boundary layers of air and it can be expected that the air spaced inwardly from the inner surface will be slightly hotter than the temperature of the roll itself because of the position of the heaters. Thus, as the unit rotates past the baffle panel 40, part of the air will be sheared off by this baffle and a small air layer moving with the roll will exist between the baffle 40 and the inner surface of the roll. This small layer of air which is rotating very fast will be fairly close to the temperature of the inner surface of the roll itself. Then, when this layer strikes the first baffle wall 47 which projects about 0.010 outwardly from the periphery of the baffle 40, a further thin layer of air will be sheared off and directed down between the fluid passage formed by the baffle wall 43 and the first baffle wall 47. Additional air will be sheared off and pass between the fluid passageway formed by the first and second baffle walls 47. All of this air will be the air that is the farthest from the moving surface. Air will also move through the fluid passageway 51 and as it does, this air will be drawn from very close to or right next to the surface 23 and will be substantially at the temperature of the roll surface. The temperature sensor 50 will thus be subjected to a flow of air which is very close to the temperature of the surface and is a good indication of the surface temperature. The sensor will be connected to suitable instruments which will either directly read this temperature or will be connected to automatic controls which will regulate the output of the heaters 35 in accordance with the temperature sensed by the sensor 50. These controls are well known and the only problem has been to obtain a true measure of the temperature of the roll surface.

By shearing off the layers of air which are spaced from the surface and sampling for temperature of the air that comes directly from contact with the surface, the measurement of the temperature is much more accurate and permits better control of the heaters. To aid this sampling, as the roll rotates, there is a natural tendency for the air to be thrown outwardly under centrifugal force by the surface 24. This will cause air to be sucked inwardly around the part of hub 21 much in the direction as indicated by the arrows 53 in FIGURE 1 and flow along surface 23 toward the open end of the roll. This air will in turn flow through fluid passageways formed by the baffle walls 47 and this forms a natural pumping action which insures an adequate flow of air through fluid passageways and over the temperature sensor 50. The pumping action will occur through the openings formed by the baffle walls 43, 44 and 47 because the radiation shields 33 and the baffle panels 40 and 41 are sealed with respect to the plates 30 and 31 except in the baffle area. This pumping action forms means for insuring a flow of air across the temperature sensor. If desired, in applications where this pumping action does not exist, a small fan can be placed so as to draw a flow of air past the baffles and past the temperature sensor.

The temperature sensor can be mounted to the end plates 30 and 31 in any desired manner. The sensor usually is of a resistance wire type which is relatively rugged and has quick response.

The positioning of the baffle walls to shear off the layers of air so that the first layers are removed and then subsequently the air that is contiguous to the surface moving across the temperature sensor assures accurate measurement of temperature without critical positioning of the sensor next to the surface itself.

While four baffle walls 47 have been shown, satisfactory results can be obtained with two or even with no baffles other than 43 and 44. If only baffles 40 and 41 are used, they will still shear off the cooler layers of air and deflect part of the air carried by the rotating roll. Of course, the accuracy drops off with removal of some of the baffles. The unit shown is made so it can be rotated in either direction and will operate just as well in either direction. If the roll was always going to rotate in only one direction, then the rotationally trailing half of the baffle walls 47 (behind the sensor) could be reduced in number without harming the operation. Another benefit of the opening 42 in the center section is to provide for an air return for the centrifugal pumping action so that this heated air is not discharged out the open end of the roll. This reduces heat loss from the roll.

A rear radiation shield 54 can also be mounted at the open end of the roll 11 to prevent heat from the heaters 35 from radiating outwardly. The radiation shield is merely mounted onto the tubes 27 by welding it in place or fastening it in another suitable manner. The shield 54 also has an opening for shaft 12.

In FIGURES 4 and 5 there is shown a modification of the invention that is useful for sensing temperatures of other surfaces. As shown a member 57 has a surface 58, which is to be sensed for temperature. An annular baffle wall 59 is mounted adjacent the surface 58 and forms an opening 60. The wall continues upwardly to form a housing having an outlet opening 61.

A plurality of spaced apart concentric baffles 62 are fixedly positioned with respect to the outer baffle with small mounting members and define concentric fluid passageways from opening 60 to the outlet opening 61. The baffles are cylindrical walls substantially normal to the surface 58. These walls have one edge adjacent the surface 58 and extend away from the surface.

An ejector pump 70 is provided at the outlet opening 61 and comprises a nozzle blowing air out through the opening to create a partial vacuum inside the outer wall 59 and draw air in through opening 60. Air flows across the surface 58 as shown by arrows 63 and enters opening 60 all around the periphery of the baffle so the flow direction is normal to the baffles. Each of the outer fluid passageways formed by the concentric baffles bleeds off part of the air flowing in, and the air entering center passageway 64 will be substantially at the temperature of the surface 58. A temperature sensor 65 is mounted in the center passageway 64 and thus senses the temperature of the surface 58. The member 57 can be stationary or moving. The pump 70 could be replaced with a small fan or the like to get the necessary flow of air.

Here again the baffles are closely adjacent the surface, and the first fluid passageways encountered by the fluid divert the outer layers of air. Thus the air in subsequent layers is closer to the surface temperature and the temperature sensed by sensor 65 will be substantially the same as the temperature of the surface.

This set up could be used for sensing the temperature of metal being processed, or used in paper making.

The flow of fluid here is normal to the baffle wall as it is drawn in around the periphery. The baffle scavenges succeeding layers of air in direction toward the center fluid passageway in which the sensor is located.

While the concentric walls are shown terminating along a common plane, some of the walls could be spaced farther from the surface than others in order to enhance or modify the fluid flow.

Also, the walls in both forms of the invention could be angled or inclined with respect to the surfaces in order to obtain different air flow patterns.

Since the roll heater design of FIGURES 1–3 does not require close spacing between the heater element and roll surface, it may be noted that axial temperature profiling may be readily and accurately done by adjusting the pitch of a wound heater element 35 in the axial direction, for example.

Although the heating elements 35 are shown having an axial orientation, other configurations could be used such as axially spaced heater elements mounted generally perpendicular to the roll axis, and which include the tubular shield around the elements.

What is claimed is:

1. In a rotating roll having a wall with an inner surface defining a chamber and an outer surface, the improvement comprising heater means positioned adjacent the inner surface of said rotating roll, said heater means including resistance element means within said roll, said element means being surrounded by an imperforate tubular member substantially transparent to radiant energy, baffle means, means to mount the baffle means within the chamber and adjacent the inner roll surface, said baffle means defining an opening open to the inner surface through which air normally moving with the inner surface will flow, and a temperature sensor mounted in the path of air flow through said opening.

2. In combination, a member having a moving surface with fluid in contact therewith, baffle means mounted adjacent said moving surface and defining a plurality of fluid passage means forming an opening, a temperature sensor, means to mount said temperature sensor in one of said fluid passage means, said moving surface causing a flow of fluid from adjacent the surface through said opening and across said temperature sensor in the fluid passage means, and said baffle means being positioned with respect to the flow of fluid so that a portion of the fluid flowing through said passage means is diverted into fluid passage means other than the fluid passage means in which said sensor is positioned.

3. A cup-shaped rotating roll having a cylindrical wall with a cylindrical inner surface, a cylindrical outer surface, and one closed end, baffle means mounted within said cup-shaped roll and closely adjacent the inner surface thereof, defining an opening having fluid passage means, a temperature sensor, means to mount said temperature sensor in said fluid passage means, said inner surface causing flow of fluid from adjacent the surface through said opening and across said temperature sensor in the fluid passage means.

4. The combination as specified in claim 1 wherein at least a portion of the baffle means comprise part-cylindrical panels substantially concentric with the axis of rotation of said rotating roll, said part-cylindrical panels having edges defining said opening, and extending from said opening in either rotational direction of said roll, a heat radiation shield means positioned on the side of said heater means opposite from said inner surface, each of said part-cylindrical panels joining the radiation shield means at the panel edge opposite from the panel edge defining said opening.

5. The combination as specified in claim 2 wherein at least some of the baffle means are formed from baffle walls, said baffle walls being positioned so that they are substantially normal to the direction of movement of fluid moving toward said opening along the surface, and are spaced from each other and from the edges of said opening and wherein said temperature sensor is positioned so that a fluid flows from the surface across the sensor after the fluid has passed at least one baffle wall.

6. The combination as specified in claim 2 wherein said surface is a cylindrical surface formed in a rotating member, and wherein said baffle means remains stationary.

7. The combination as specified in claim 6 and heater means positioned adjacent said cylindrical surface to heat said rotating member.

8. The combination as specified in claim 2 wherein at least some of said baffle means are formed of baffle walls having one edge adjacent the surface and extending away from said surface and being spaced from each other and from the edges of said opening.

9. The combination as specified in claim 8 wherein said surface is a surface formed in a rotating member and heater means positioned adjacent said surface in position so that a point on said rotating surface passes over said heater means; subsequently passes at least one baffle wall; and subsequently passes said sensor during each revolution.

10. The combination as specified in claim 3 and heater means positioned adjacent the inner surface of said rotating roll and spaced at predetermined angular intervals, said heater means having heating elements extending in the axial direction of said roll, each of said heating elements being surrounded by an imperforate tubular member substantially transparent to radiant heat energy.

11. The combination as specified in claim 10 wherein said heater means are mounted on a mounting member, said mounting member including heat radiation shield means positioned on a side of said heater means opposite from the inner surface of said roll, said radiation shield means being effective to reflect a substantial portion of the radiant energy from said heater means.

12. The combination as specified in claim 3 wherein said baffle means extend substantially parallel to diametral planes.

13. The combination as specified in claim 11 and mounting means for said heater means comprising a pair of spaced apart substantially parallel end plates which define planes substantially perpendicular to the axis of rotation of said roll, said end plates being of material which reflects radiant heat energy, said heater means being positioned between said end plates.

14. The combination as specified in claim 13 wherein said baffle means extend between said end plates and are spaced from said heater means.

15. The combination as specified in claim 13 wherein a portion of the baffle means comprise part-cylindrical panels mounted on said heater mounting means, said part-cylindrical panels having first edges defining said opening and extending from said opening in either rotational direction and each of said part-cylindrical panels joining a radiation shield means at its edge opposite from the edge thereof defining said opening.

16. The combination as specified in claim 15 wherein said part-cylindrical walls are concentric with and closely adjacent the inner surface of said rotating roll and wherein said baffle means further comprise baffle walls within the opening and having edges adjacent to the surface of said roll and extending generally inwardly toward the center of the roll.

17. The combination as specified in claim 16 wherein said baffle means are positioned symmetrical with respect to the temperature sensor in either angular direction from the sensor.

18. The combination as specified in claim 15 and means to join said radiation shield means, and said part-cylindrical panels form a substantally closed peripheral wall inside said chamber except for said opening defined by said panels.

19. The combination as specified in claim 14 wherein one of said end plates is positioned adjacent the closed end of said roll, and wherein said one end plate has a center opening adjacent the axis of rotation of said roll and being of sufficient size to permit fluid to pass through said center opening as said roll rotates to thereby enhance fluid flow through the opening defined by the baffle means under centrifugal pumping action of the roll.

20. The combination as specified in claim 8 wherein said baffle walls comprise a plurality of substantially concentric circular walls, said sensor being positioned within an interior circular wall.

21. The combination as specified in claim 8 wherein the outer baffle wall forms a closed housing having an outlet opening, said means to cause a flow of fluid causing a discharge of fluid which has passed through said fluid passage means from said outlet opening.

References Cited

UNITED STATES PATENTS

| | | | |
|---|---|---|---|
| 1,514,288 | 11/1924 | Hynes | 219—470 |
| 2,904,317 | 9/1959 | Copeland et al. | 219—371 |
| 3,105,133 | 9/1963 | Norton | 219—469 |
| 2,764,664 | 9/1956 | Stewart | 219—411 |

BERNARD A. GILHEANY, Primary Examiner

F. E. BELL, Assistant Examiner

U.S. Cl. X.R.

219—377, 411